July 28, 1970  A. MARCHANT  3,522,123

METHOD OF FORMING INFLATABLE PLASTICS VOLUMES

Filed Sept. 16, 1966

INVENTOR
ANDRÉ MARCHANT

BY Hane & Nydick

ATTORNEYS

United States Patent Office 3,522,123
Patented July 28, 1970

3,522,123
METHOD OF FORMING INFLATABLE PLASTICS VOLUMES
André Marchant, Neuilly-sur-Seine, France, assignor to Societe dite: Dumoutier-Decre S.A., Neuilly-sur-Seine, France
Filed Sept. 16, 1966, Ser. No. 580,026
Int. Cl. A47c *27/08*
U.S. Cl. 156—216      6 Claims

ABSTRACT OF THE DISCLOSURE

To provide a quilted effect in an inflatable object, a tubular member is welded between two opposed inside surfaces to produce a concavity when the object is inflated. The tubular member can be of nylon knit and is elastic at its ends. The ends are rolled back over a washer to form an annular welding surface. An intermediate member can be inserted between the respective tube ends and the inside surfaces to which they are welded.

---

Pneumatic cushions and mattresses and the like, made of flexible welded plastic sheets, have developed as inflatable objects. With respect thereto, endeavours have been made to give such volumes the appearance and feel of corresponding textile items by the use of concave zones leading to a wavy three-dimensional surface. It has been fairly easy to produce this effect on inflatable rubber or rubberized-cloth objects since all that had to be done was to interconnect the two surfaces of the volume by bands or strips shorter than the average thickness as disclosed, for example, in French patent 1,246,862. Unfortunately, this simple procedure cannot be used in cases where, instead of rubber, plastic sheets such as, for instance, polyvinyl chloride or polythene are used. This is due to the fact that, whereas rubber withstands all stressing fairly well, polyvinyl chloride sheet tears much more readily than rubber, particularly at the places where the strips or bands are welded to the inside surfaces of the object involved. French patent of addition 76,656 based on French Pat. 1,246,862 suggested an improvement known as quilting wherein the connecting strips were replaced by rovings or tufts whose ends expand and thus lead to improved stress distribution in the weld zones. However, the components of the rovings make the weld irregular as a result of which this technique was not as satisfactory in practice as seemed likely from theory.

The present invention provides a new and completely satisfactory solution of the problem and obviates any risk of irregularity in a weld in a completely circular zone. According to the invention, the element bringing the two surfaces of the volume together to give the same a three-dimensional wavy appearance is a circular cross-section tube or sleeve made of a natural or synthetic textile, preferably knitted nylon, so that the zone where each tube end is welded to each inside surface of the volume is a circular ring in which stressing is distributed uniformly.

According to a feature of the invention, the weld is made with the use of tooling and extra sheet-plastic elements adapted to expand the tube end and to connect the same to the inside surface of the volume over a uniform ring-shaped weld zone of much greater diameter than the tube. To this end, according to a feature of the invention, the terminal portion of the nylon tube is knitted with an insertion of resilient, preferably rubber, filaments; and such end is prepared for welding by being expanded over the circular edge of a recessed bearing member. According to another feature of the invention, the expanded end, instead of being directly welded to the inside surface of the volume, is welded to an intermediate plastic sheet which is welded to the volume in the circular zone of increased diameter.

Figure 1:
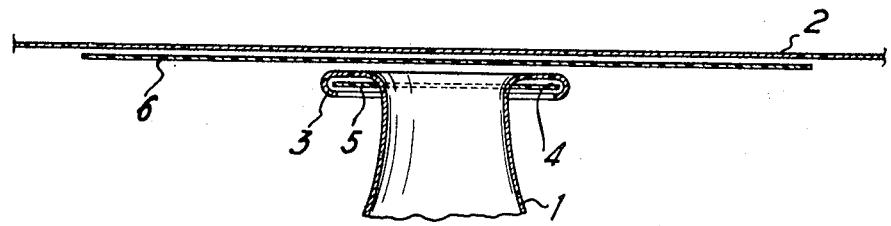
Figure 2:
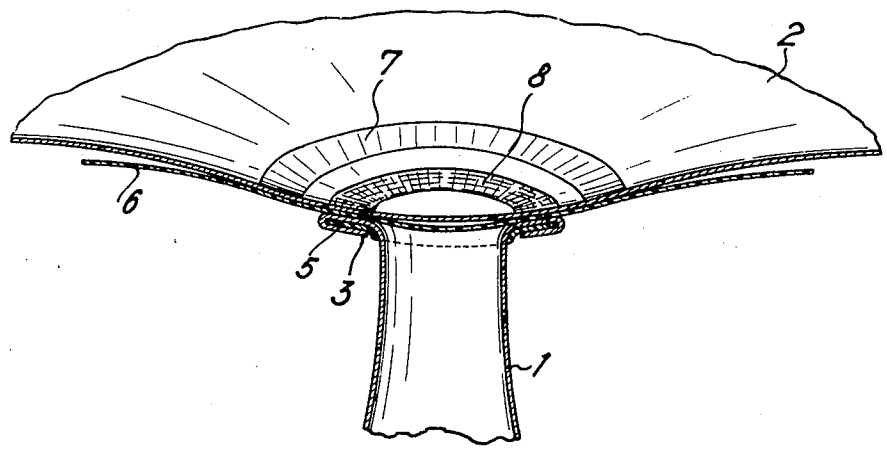

The invention will now be described in greater detail with reference to the accompanying drawings wherein:

FIG. 1 is a diagrammatic section of the zone of a pneumatic mattress where a quilting element will be welded, and FIG. 2 is a perspective and partly cross-sectional view of the same zone after welding.

In the figures like elements have like references.

Referring to the drawing, a knitted nylon tube 1 is welded to the inside surface of one of sides 2 of a pneumatic mattress. According to the invention, the tube 1 is knitted with resilient filaments at least near its end, so that, in readiness for the weld, the end 3 comprising the resilient filaments can be turned around a circular edge 4 of a recessed bearing member 5 through which the tube is inserted in order to form a laminate. In practice, a sheet-plastic disc or washer or the like is used as the bearing member. The washer 5 can be seen in FIG. 1 but cannot be seen individually in FIG. 2 since it has taken part in the welding.

A second sheet-metal or plastic washer or disc 6 or the like is then placed above the expanded or widened end 3, whereafter, and as can clearly be seen in FIG. 2, the resulting system is welded in two concentric circles 7, 8 to the mattress surface 2.

As FIG. 2 shows, the weld 7, 8 takes the form of a continuous ring zone whose diameter is considerably more than the diameter of the tube 1.

One result of the step of welding the elements 6 and 2 together is to expel air trapped between the elements 6 and 2, so that there is a suction effect leading to the concave appearance visible in FIG. 2. This concave appearance, which resembles the quilting effect employed in upholstery, is the result of the two surfaces of the mattresses being brought towards one another, but no one part of the element bringing the surfaces together experiences stressing different from any other part. This feature insures the strength and aesthetic appearance of the system, the regular weld zone being free from any waviness or fold since there is substantially no mutual overlapping of the filaments. Just as good a result, or possibly even a better result, would be obtained with a tube made of parallel unwoven fibres, bonded together, for example, by a resin.

The invention is of course of use with all inflatable sheet-plastic objects as well as with mattresses and cushions; it can, for instance, be applied to inflatable swimming pools. There are various other uses for inflated objects having at least one concave zone produced in accordance with the invention. For instance, a concave zone of this nature can be used as a suction cup to secure an inflated object to a flat surface.

Although reference has been made in the foregoing to a circular knitted tube, the tube can of course have a different cross-section such as, for instance, an oval cross-section, without any change in the uniformity of the weld. The method according to the invention can of course be adapted to inflatable rubber objects if conventional vulcanising techniques are used.

What is claimed is:

1. A method of providing a quilted effect in a polyvinyl chloride or polythene inflatable object comprising attaching to at least one inside surface of the object along a closed connection zone, one end of a knitted, textile tube which is anchored at a position remote from said zone in order to produce a concavity at said zone when the object is inflated, at least said end of the tube being elastic, said attaching being effected by inserting said one end through a thermoplastic washer-like member and rolling said one end back around the washer member to provide an enlarged annular surface for connection to said connection zone, and welding said member to said object to form a continuous weld region in which a part of said one end of the tube is embedded.

2. A method as claimed in claim 1 wherein said washer-like member is poylvinyl chloride.

3. A method of providing a quilted effect in a thermoplastic inflatable object comprising attaching to at least one inside surface of the object, one end of a textile tube which is anchored at a position remote from the attaching in order to produce a concavity at the attaching region when the object is inflated, at least said end of the tube being elastic, said attaching being effected by inserting said one end through a thermoplastic washer-like member and rolling said one end back around the washer member to provide an enlarged annular surface, interposing a further thermoplastic member between said inside surface and the annular surface, welding the first thermoplastic member to said further thermoplastic member along a continuous weld region at the annular surface of the tube so that a part of said one end of the tube is embedded in said members along a closed connection zone, and welding the further thermoplastic member to the object along a further closed connection zone which is larger than the first said connection zone.

4. A method as claimed in claim 3 wherein the zones are concentric circles and said tube is of circular cross-section.

5. A method as claimed in claim 3 wherein said tube is formed of nylon knit including resilient filaments at said one end.

6. A method as claimed in claim 3 wherein said tube includes a second end which is connected in the same way as said first end to an inside surface of said object which is opposed to the first said inside surface.

References Cited

UNITED STATES PATENTS

| | | | |
|---|---|---|---|
| 660,466 | 10/1900 | Sawtell | 5—350 |
| 2,634,013 | 4/1953 | Atwood | 156—69 X |
| 2,645,591 | 7/1953 | Makrauer | 156—69 |
| 2,951,004 | 8/1960 | Martin et al. | 156—309 |
| 3,192,091 | 6/1965 | Hey et al. | 156—309 X |

FOREIGN PATENTS 1,246,862   10/1960   France.

JOHN T. GOOLKASIAN, Primary Examiner

J. C. GIL, Assistant Examiner

U.S. Cl. X.R.

5—348; 156—297, 306, 309; 161—69, 89, 116; 264—248